United States Patent [19]

Perego

[11] Patent Number: 4,739,851

[45] Date of Patent: Apr. 26, 1988

[54] CHILDREN'S MOTOR VEHICLE WITH IMPROVED BEARING STRUCTURE

[75] Inventor: Gianluca Perego, Arcore, Italy

[73] Assignee: Peg-Perego-Pines S.p.A., Italy

[21] Appl. No.: 849,882

[22] Filed: Apr. 9, 1986

[30] Foreign Application Priority Data

Apr. 16, 1985 [IT] Italy ................. 21547/85[U]

[51] Int. Cl.[4] ............................................. B60K 1/00
[52] U.S. Cl. ................................. 180/65.1; D12/110; 446/440
[58] Field of Search ................. 180/58, 60, 291, 65.1, 180/68.5, 312, 210, 214, 218, 219, 220; 280/281 R, 274, 1.1 R, 1.13; D12/110; 446/465, 470, 440

[56] References Cited

U.S. PATENT DOCUMENTS 4,520,891  6/1985  Omholt ........................... 180/219
4,560,022  12/1985  Kassai ........................... 180/65.1

OTHER PUBLICATIONS

Auranthetic Corporation, 6/28/74, Electronically Operated Motorcycle.

Primary Examiner—John J. Love
Assistant Examiner—Richard Camby
Attorney, Agent, or Firm—McGlew and Tuttle

[57] ABSTRACT

A children's motor vehicle comprises a differentiated bearing structure consisting of a single piece moulded out of plastics material, having a generally cradle-like configuration, with a rear box-like portion and a front reticular portion, adapted to house respectively an electrical battery for supplying power to the motor and the motor itself.

5 Claims, 4 Drawing Sheets

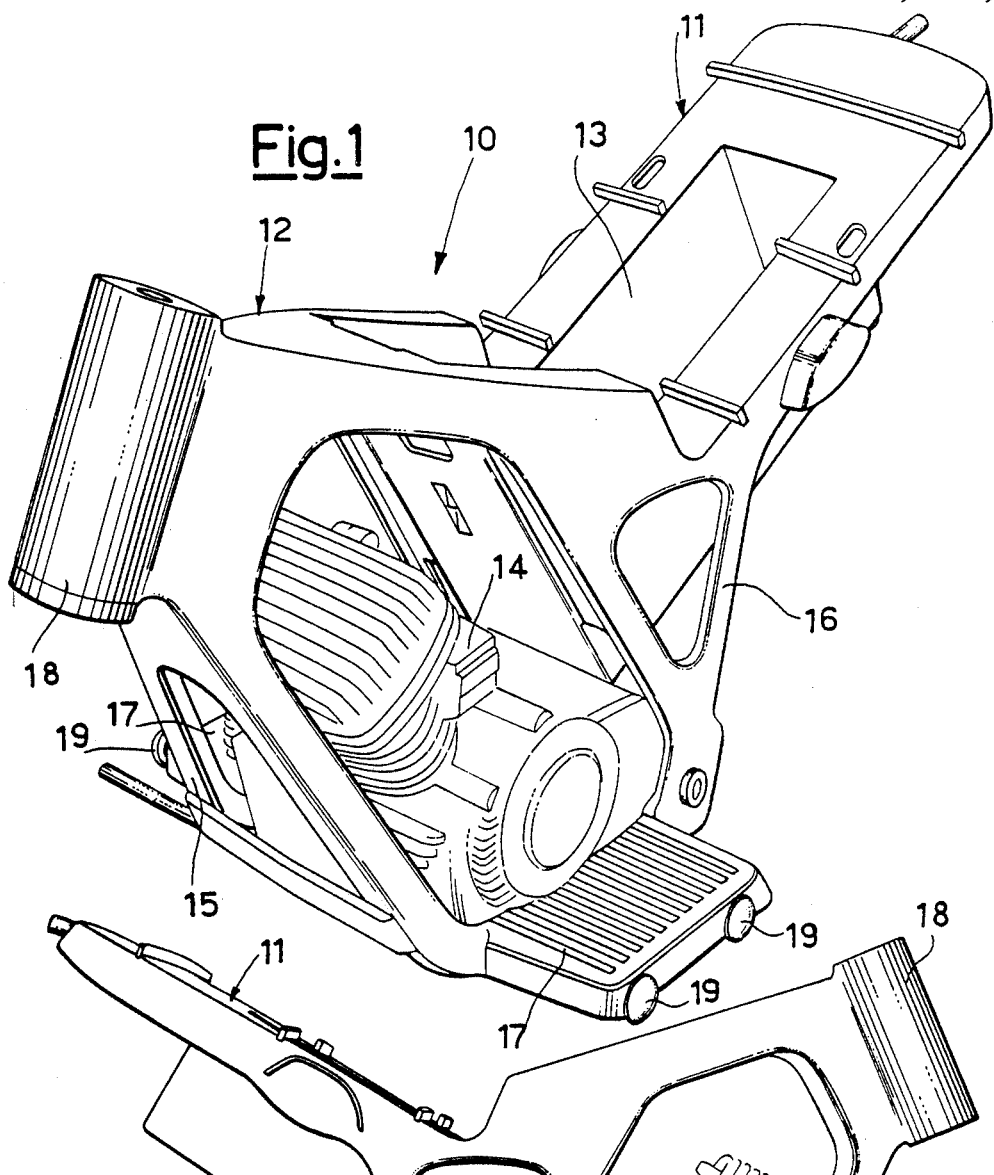
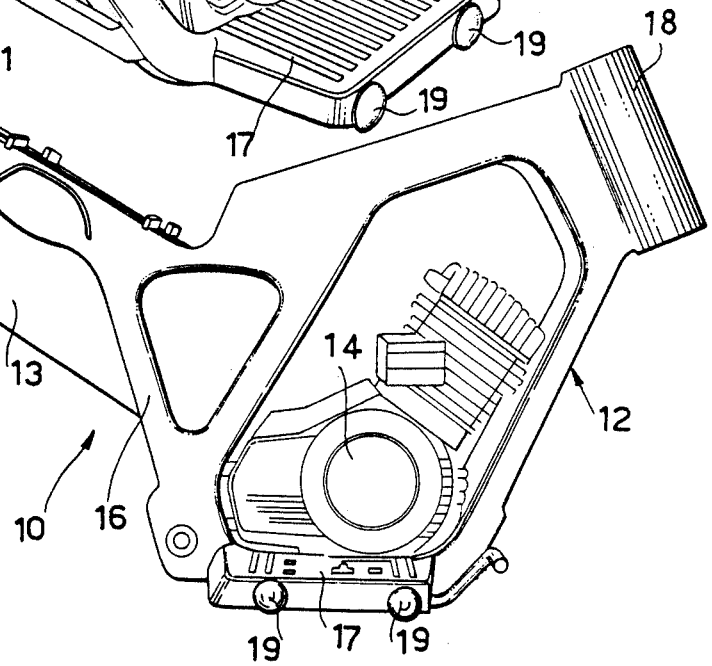

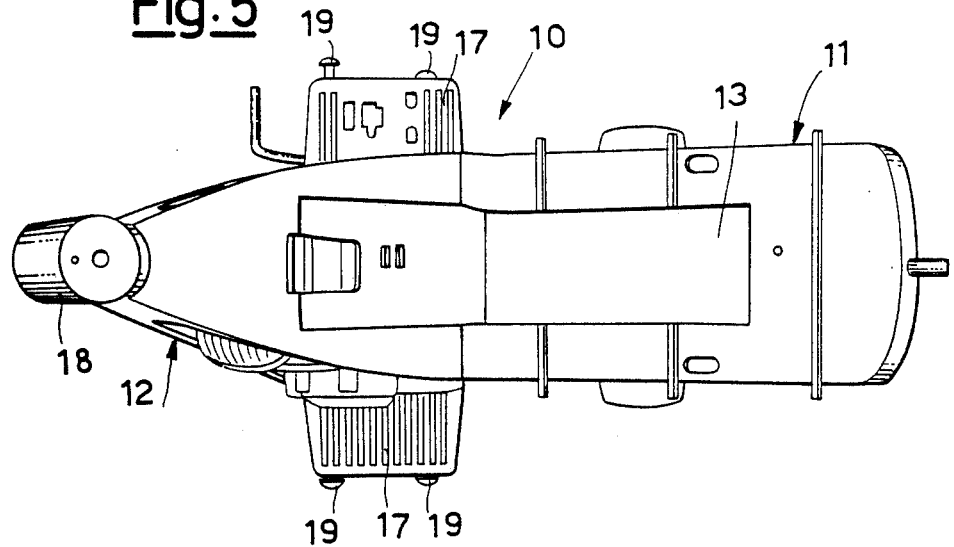
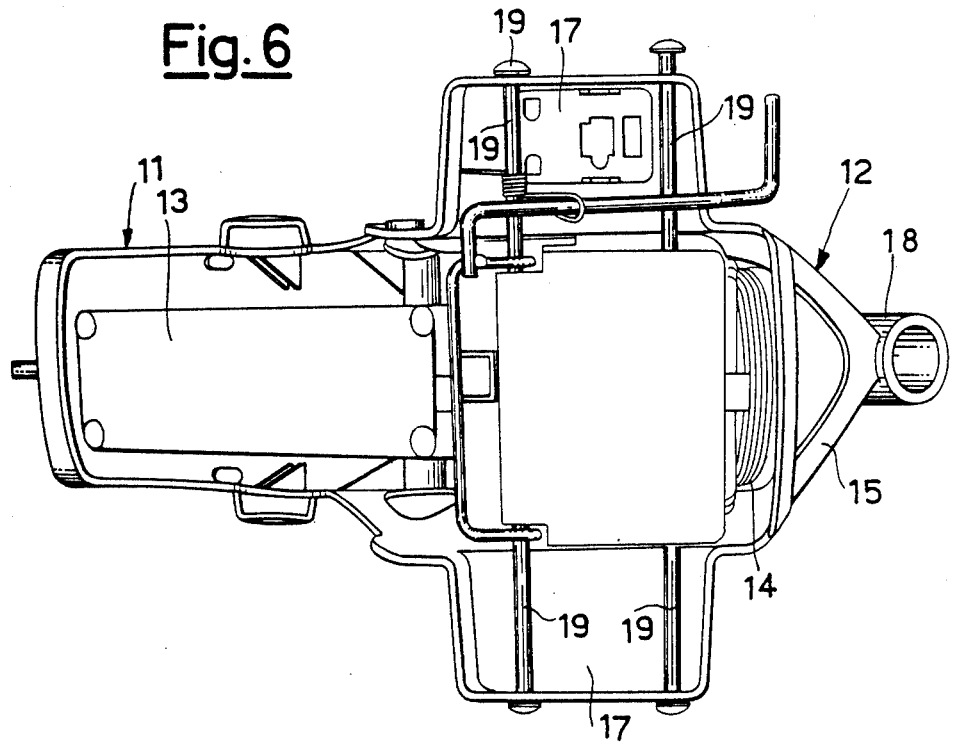

CHILDREN'S MOTOR VEHICLE WITH IMPROVED BEARING STRUCTURE

The present invention relates to a children's motor vehicle powered for example by an electric battery, having an improved bearing structure.

Battery powered motor vehicles for children are known in which the bearing structure consists of a frame featuring metallic tubular elements suitably bent and interconnected so as to more or less faithfully reproduce the appearance of a real motor vehicle, and also to assure an adequate resistance to the often severe stresses to which the vehicle is subjected.

Such type of bearing structure is, however, very costly as a result of the need variously to bend and interconnect the different tubular elements composing it.

To overcome the drawback of high cost, proposals have already been made to embody bearing structures consisting of a ribbed, box-like single piece moulded out of plastics material.

Though solving the problem of production costs, embodiments of this kind provide models of poor quality, of appearance remote from that of a real motor vehicle, which do not satisfy the requirements of children inasmuch as it is the closeness to the original that children admire.

SUMMARY OF THE INVENTION

The object of the present invention is thus to embody a bearing structure for children's motor vehicle so conceived as to combine the economic advantage of a box-like structure moulded out of plastics material with the further advantages of appearance and ruggedness found in bearing structure employing metallic tubular elements.

To attain this object, the present invention embodies a bearing structure for children's motor vehicles characterized in that it comprises a single piece moulded out of plastics material, generally in the shape of a cradle, with a box-like rear portion and a reticular front portion, adapted to house respectively an electric battery for driving the motor and the motor itself.

The structural and functional characteristics of the invention, and its advantages over the known art, will become more apparent from an examination of the following description referred to the appended drawings, which show an example of bearing structure embodied in accordance with the innovative principle of the invention.

BRIEF DESCRIPTION OF THE DRAWINGS

In the drawings:

FIG. 1 is a perspective view illustrating the said structure;

FIG. 2 is a lateral elevational view;

FIG. 5 is a top plan view;

FIG. 6 is a bottom plan view; and

DESCRIPTION OF THE PREFERRED EMBODIMENT

Figure 3:
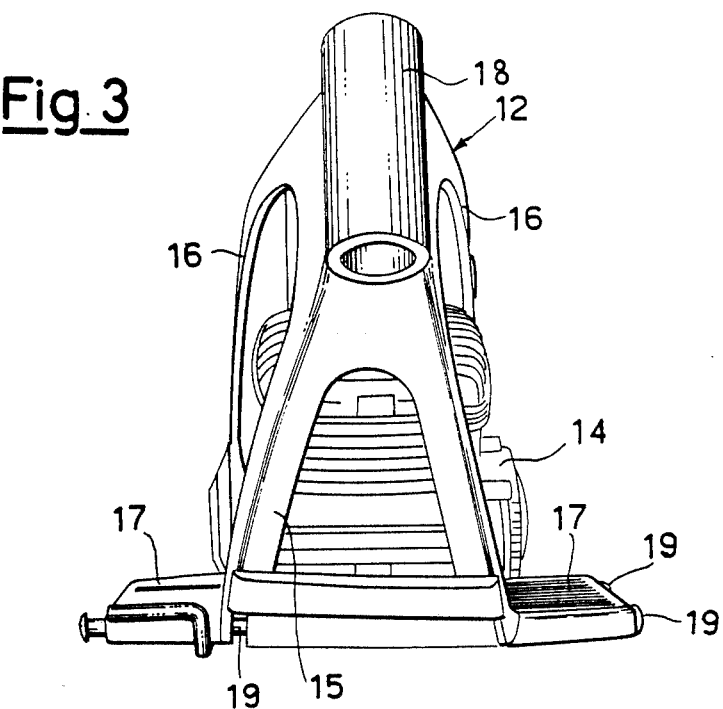
FIG. 3 is a front elevational view.
Figure 4:
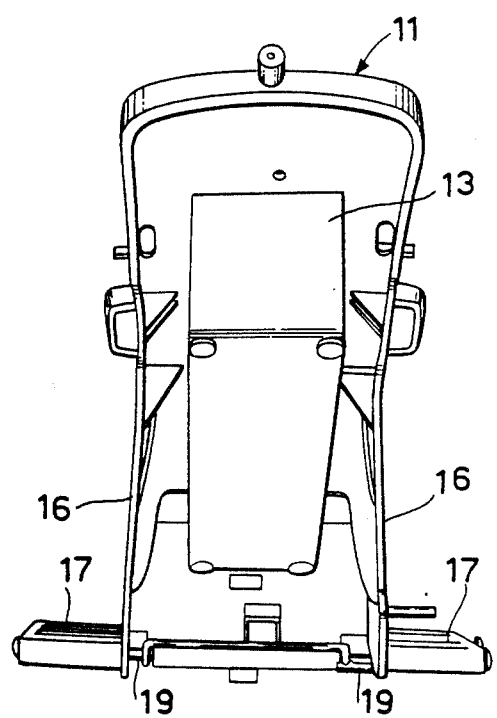
FIG. 4 is a rear elevational view.

With reference to the drawings, the bearing structure according to the invention is indicated overall by 10 and consists of a single piece moulded out of a suitable plastics material, having a general "cradle" configuration, i.e. a splayed-side "V" configuration.

The said cradle has a characteristic differentiated structure featuring a box-like rear portion 11 and a reticular front portion 12 which is suitably spaced with respect to the rear portion.

As well as assuring an adequate resistance to stresses, in particular the more severe torsional stresses, the box-like rear structure 11 forms a generously-sized and convenient compartment 13 providing a housing, not visible, for an electric battery (not shown) for supplying power to a motor (not shown).

As can be clearly seen from the drawings, a model engine 14, which mimics the appearance of an internal combustion engine, is supported in a clearly visible and aesthetically convincing manner within the front reticular 12.

More specifically, the reticular structure 12 includes an upper bearing structure, a generously-sized triangular portion 15, which is slanted forwards, and a pair of lateral portions 16—also triangular—separated from the frontal portion 16 so as to allow a free space for receiving and housing the simulated engine 14, thus obtaining a convincing effect of realism.

The portions 15 and 16 of the reticular structure 12 are connected in their lower areas by footboards 17 and in their upper areas by a sleeve 18.

As well as fulfilling their normal function, the said footboards 17 support the model engine 14 by means of a pair of tie-rods 19.

The pin of the front fork of the motorcycle is coupled to the sleeve 18.

Figure 7:
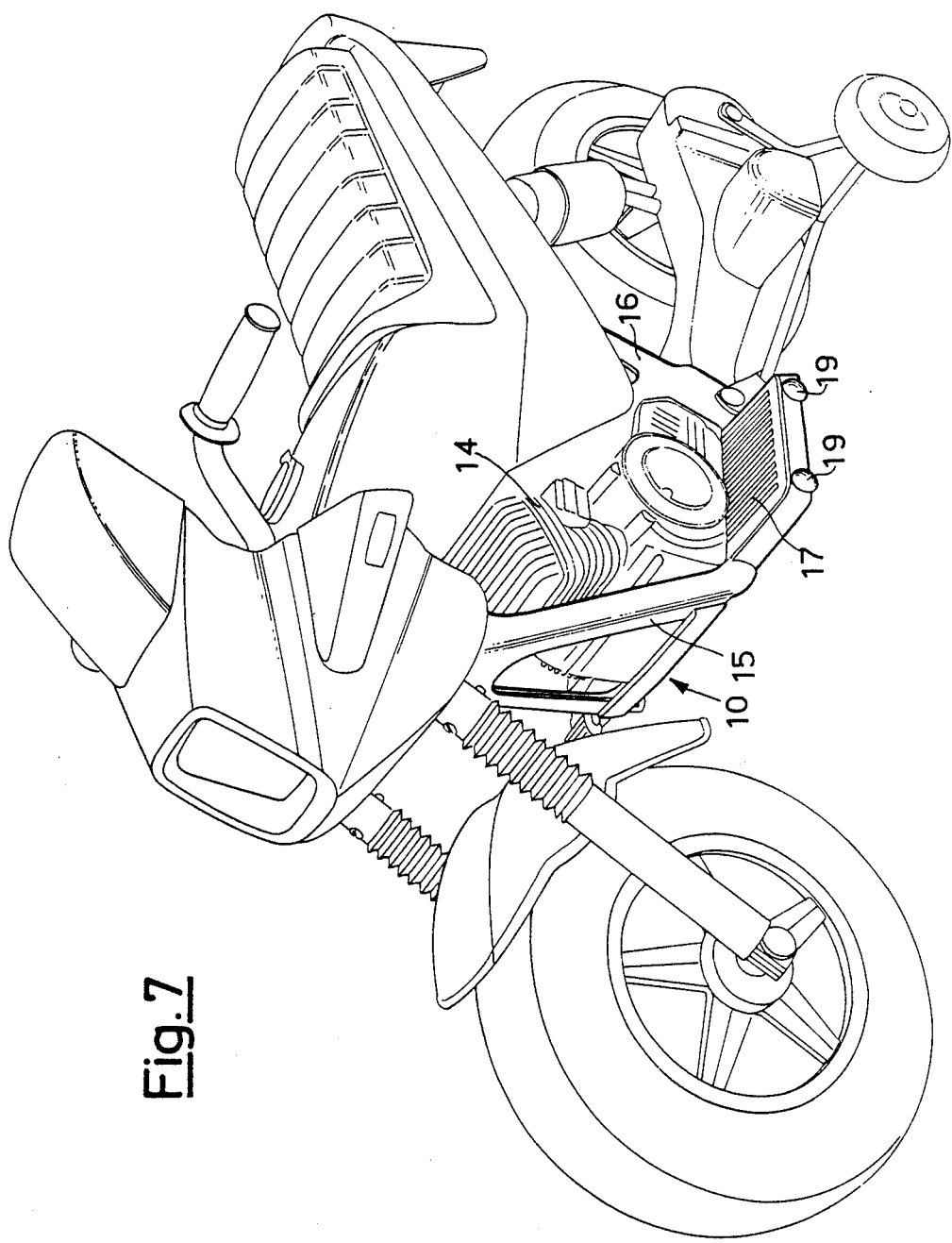
FIG. 7 is a perspective view illustrating in an exemplifying and not limiting manner the profile of a motorcycle employing the bearing structure shown in FIGS. 1-6.

As is clearly seen from FIG. 7 of the drawings, a differentiated bearing structure embodied according to the present invention is not only economical to manufacture and provided with sufficient mechanical strength, but makes it possible to embody convincing models practically identical to the real motor vehicle.

I claim:

1. A children's motor vehicle including a front fork and wheel assembly, rear wheel assembly, motor, electrical battery and a bearing structure, and having a front end, a rear end, a right side and a left side, the bearing structure comprising: an upper bearing structure, extending from the vehicle front end toward the vehicle rear end direction; a first lateral portion connected to said upper bearing structure at the left side of the rear end of said upper bearing structure and extending downwardly; a second lateral portion connected to said upper bearing structure at the right side of the rear end of said upper bearing structure and extending downwardly; a first base portion connected to a lower end of said first lateral portion and extending toward the front end of the vehicle; a second base portion connected to a lower end of said second lateral portion and extending toward the front end of the vehicle; a triangular portion having a base member connected to said first base portion and connected to said second base portion and first and second side portions each connected to said base member at opposite sides of said base member and extending upwardly to said upper bearing structure, each of said first and second side members connected to said upper bearing structure and each other; and, box-like compartment structure, connected to said upper bearing structure, said first lateral portion and said second lateral portion and extending from said first and second lateral portion upwardly and toward the vehicle rear end, said triangular portion, said first and second base portion, said first and second lateral portion, said upper bearing structure and said box-like compartment being formed integral of a single piece of molded thermoplastic, said box-like compartment forming a housing for the electrical battery and said triangular portion, said first and second lateral portion, said first and second base portion and said upper bearing portion forming a housing for the motor.

2. A children's motor vehicle according to claim 1 further comprising: a mounting sleeve adapted to receive the front fork, said mounting sleeve connected to said upper bearing structure and said first and second side portions of said triangular portion and, formed integral with said upper bearing structure and said triangular portion.

3. A children's motor vehicle according to claim 2 wherein: said first and second base portions each include horizontally extending footboards, said footboards each being formed integral with respective, associated first and second base portions.

4. A children's motor vehicle according to claim 2 wherein: said box-like compartment structure supports a motor vehicle seat.

5. A children's motor vehicle including a front fork and wheel assembly, rear wheel assembly, motor, electrical battery and bearing structure, and having a front end, a rear end, a right side, a left side, the bearing structure comprising: a mounting sleeve receiving the front fork; an upper bearing structure connected to said mounting sleeve and extending toward the vehicle rear end direction; a first lateral portion, connected to said upper bearing structure at the left side of the rear end of said upper bearing structure and extending downwardly; a second lateral portion connected to said upper bearing structure at the right side of the rear end of said upper bearing structure and extending downwardly; a first base portion connected to a lower end of said first lateral portion and extending toward the front end of the vehicle, said first base portion including a left side, horizontally extending footboard; a second base portion connected to a lower end of said second lateral portion and extending toward the front end of the vehicle, said second base portion including a right side, horizontally extending footboard; a triangular portion having a base member connected to said first base portion and connected to said second base portion and having first and second side portions each connected to said base member at opposite sides of said base member and extending upwardly to said mounting sleeve, each of said first and second side member connected to said mounting sleeve and each other; box-like compartment structure, connected to said upper bearing structure, said first lateral portion and said second lateral portion and extending from said first and second lateral portion upwardly and toward the vehicle rear end, said triangular portion, said first and second base portion, said first and second lateral portion, said upper bearing structure said mounting sleeve and said boxlike compartment being formed integral of a single piece of molded thermoplastic, said box-like compartment forming a housing for the electrical battery and said triangular portion, said first and second lateral portion, said first and second base portion and said upper bearing portion forming a housing for the motor.

* * * * *